Jan. 31, 1967 W. MAYER 3,301,953
SYNCHRONIZED TELETRANSMISSION SYSTEM WHICH DOES
NOT REQUIRE THE TRANSMISSION OF CONTINUOUS SYNC
INFORMATION TO MAINTAIN SYNCHRONIZATION
Filed Oct. 29, 1964

INVENTOR
Walter Mayer
BY
Michael J. Striker
ATTORNEY

United States Patent Office 3,301,953

Patented Jan. 31, 1967

3,301,953

SYNCHRONIZED TELETRANSMISSION SYSTEM WHICH DOES NOT REQUIRE THE TRANSMISSION OF CONTINUOUS SYNC INFORMATION TO MAINTAIN SYNCHRONIZATION

Walter Mayer, Furth, Bavaria, Germany, assignor to Grundig Elektro-Mechanische Versuchsanstalt, Furth, Bavaria, Germany Filed Oct. 29, 1964, Ser. No. 407,452

Claims priority, application Germany, Oct. 30, 1963, G 39,062

5 Claims. (Cl. 178—69.5)

Figure 1:
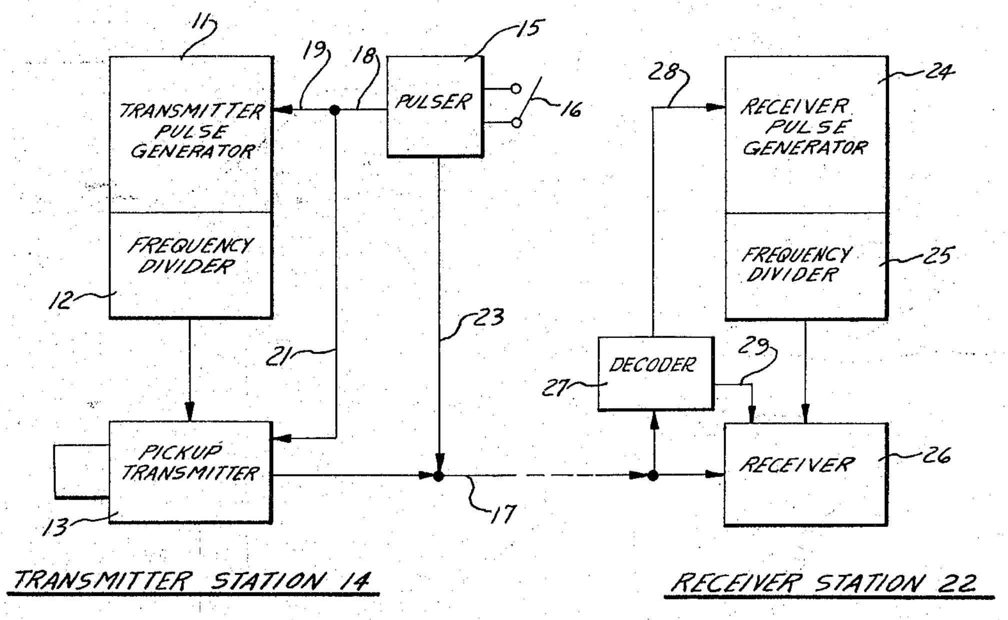

The present invention relates to a teletransmission system. More particularly, the invention relates to teletransmission system for the transmission of single pictures and series of pictures from a transmitter station to a receiver station or to a plurality of receiver stations.

The principal object of the present invention is to provide a new and improved teletransmission system.

An object of the present invention is to provide a teletransmission system which utilizes line time efficiently by transmitting a starting pulse instead of picture line frequency synchronizing pulses.

In the long range transmission of patterns of written or pictorial significance, the transmitter utilizes a pickup device which transposes the pattern or picture to be transmitted into closely packed scanning lines. An analogously, the receiver utilizes a recording receiver which reproduces the transmitted picture in accordance with the brightness distribution, line by line. This process is known as helical dissociation.

The pattern or picture to be transmitted is fixed on a rotating roller which moves ahead during each rotation by the width of one line relative to the pickup device. The receiver utilizes a similar roller covered with recording material. Even if a cathode ray tube is utilized at the receiver instead of a roller system, and the picture is photographed by an optical system, the time required for the transmission of the picture is not susceptible to reduction because the transmitter utilizes mechanical components. If the transmission time is to be reduced, the mechanically operating roller method must be eliminated because the roller is stopped after every rotation and then started again to insure synchronization in rotation and phase coincidence between the transmitter and the receiver. The constant stopping of the roller adds considerably to and determines the minimum transmission time.

It is therefore advantageous, in order to save line or transmission time, to utilize an image storing pick-up tube such as, for example, a Vidicon tube, for the pickup and transposition of the pattern or picture into a series of electrical signals. This enables the transmission of a single picture or a series of pictures of any desired object. In such a case, an image storing kinescope such as, for example, a visual retention tube, should be utilized for reproduction of the picture at the receiver. The visual retention tube permits the viewing of the reproduced picture for a period of time which is sufficient for evaluation, so that the utilization of a development step, such as is necessary in a photographic or electrographic process, is eliminated.

The transmitter and receiver must be synchronized and there must be phase coincidence between the transmitter and the receiver, in any system. Instead of the start-stop mechanical system, the synchronization of the transmitter and receiver may be achieved by the transmission of line frequency synchronizing pulses in the manner of television systems. The disadvantage of a television system synchronization system is that it does not permit the utilization of the full range of modulation for the picture signal, because a portion of the modulation must be used for the transmission of synchronizing signals. Furthermore, the reproduction of the picture at the receiver is affected by cessation or disturbance of the synchronizing signals.

In accordance with the present invention, a wire or wireless teletransmission system utilizes image storing cathode ray tubes at the transmitter and receiver stations. There is no transmission of line frequency synchronizing pulses. A starting pulse starts the operation of substantially identical pulse generators at the transmitter and receiver. The starting pulse is transmitted from the transmitter station to the receiver station. The pulse generators may comprise crystal-controlled oscillators with frequency dividers connected to their outputs. The pulse generators are stopped in operation at the end of the picture.

Furthermore, in accordance with the present invention, the operation of the pulse generators may be stopped by a grid potential applied to the oscillator tubes. The starting pulse negates the effect of the grid potential and permits operation of the pulse generator. Then, the oscillator pulse repetition rate builds up until the end of the picture, when such pulse repetition rate is sufficiently high to reinstitute the grid potential and stop the operation of the pulse generator.

Figure 2:
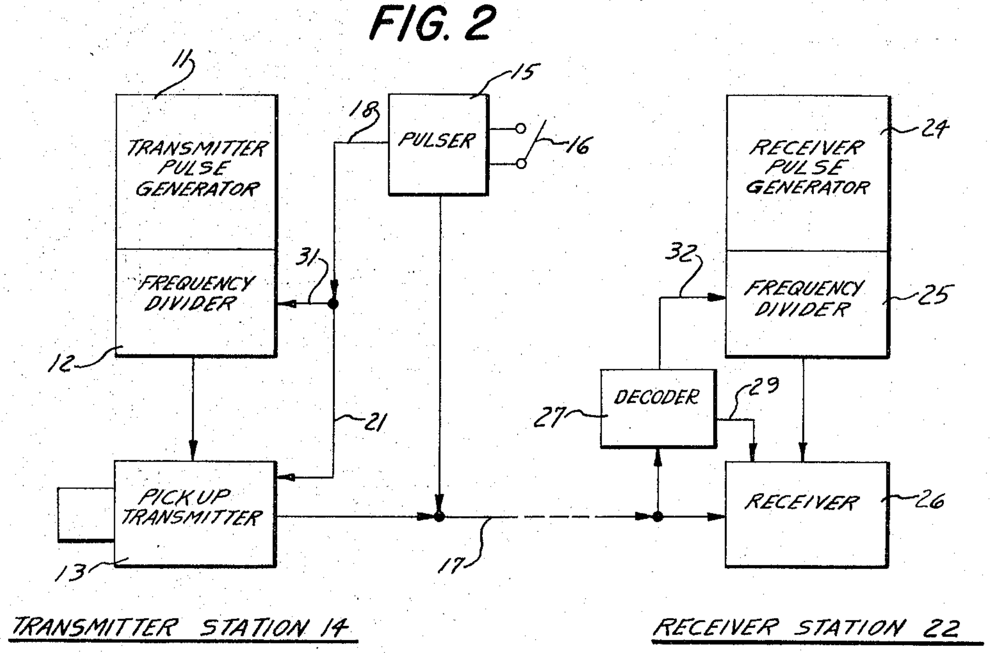

In order that the present invention may be readily carried into effect, it will now be described with reference to the accompanying drawings, wherein:

FIG. 1 is a schematic block diagram of an embodiment of a teletransmission system of the present invention; and FIG. 2 is a schematic block diagram of a modification of the embodiment of FIG. 1.

In the teletransmission system of FIG. 1, a transmitter pulse generator 11 generates pulses. A frequency divider 12 is connected to the output of the pulse generator 11 and divides the frequency of the output pulses to the picture line synchronizing frequency which is suitable for operating a pickup transmitter or picture transmitter 13 connected to the output of the frequency divider. The pulse generator 11 and the frequency divider 12 together form the pulse generator of picture line frequency synchronizing pulses of the transmitter station 14.

A pulser 15 may be actuated either automatically or manually via a switch or key 16. The pulser 15 may comprise any suitable pulse source and is connected to each of the pulse generator 11, the pickup or picture transmitter 13 and a transmission line 17. The transmission line 17 may, of course, be replaced by a suitable antenna system for wireless transmission. The pulser 15 provides a starting pulse to start the pulse generator via leads 18 and 19, to actuate the pickup or picture transmitter 13 via leads 18 and 21 and transmits a starting pulse to the receiver station 22 via lead 23 and the transmission line 17.

The receiver station 22 comprises a receiver pulse generator 24 which is substantially identical with the transmitter pulse generator 11 and generates pulses. A frequency divider 25 which is substantially identical with the frequency divider 12 is connected to the output of the pulse generator 24 and divides the frequency of the output pulses to the picture line synchronizing frequency which is suitable for operating a receiver or picture reproducer 26 connected to the output of the frequency divider. The pulse generator 24 and the frequency divider 25 together form the pulse generator of picture line frequency synchronizing pulses of the receiver station 22.

Each of the pulse generators 11 and 24 may comprise any suitable highly stable oscillator such as, for example, a crystal-controlled oscillator, and each of the frequency dividers 12 and 25 may comprise any suitable frequency divider for reducing the frequency of the pulses produced by the corresponding pulse generator.

The picture signals transmitted from the pickup transmitter 13 via the transmission line 17 are supplied to the receiver or picture reproducer 26 from said transmission line. The starting pulse from the pulser 15 is supplied to the pulse generator 24 via said transmission line, a decoder circuit 27 and a lead 28 to start said pulse generator. The starting pulse from the pulser 15 is supplied to the receiver or picture reproducer 26 via said transmission line, the decoder 27 and a lead 29 to start said receiver.

The pickup or picture transmitter 13 may comprise an image storing pickup tube such as, for example, a Vidicon tube. The receiver or picture reproducer 26 may comprise an image storing visual retention tube such as, for example, a kinescope.

In operation, when the switch 16 at the transmitter station 14 is closed, the pulser 15 produces a starting pulse which starts the pickup transmitter 13 and which starts the operation of the pulse generator 11. The starting pulse produced by the pulser 15 is also transmitted to the receiver station 22 where it starts the receiver 26 and the operation of the pulse generator 24. The production of the picture at the transmitter station 14 and the reproduction of the picture at the receiver station 22 is thus accomplished in synchronism.

The embodiment of FIG. 1 and the modification of FIG. 2 are identical and the systems of FIGS. 1 and 2 operate in the same manner, except that in FIG. 1, the pulse generators 11 and 24 are started by the starting pulse from the pulser 15. In the system of FIG. 2, however, the transmitter pulse generator 11 and the receiver pulse generator 24 are continuously operating, but normally their corresponding frequency dividers are blocked with respect to the circuit so that the output pulses of the pulse generators are not utilized in the system. In FIG. 2, the pulser 15 is connected to the frequency divider 12 and connects the pulse generator 11 into the circuit by supplying a releasing pulse to said frequency divider via leads 18 and 31. The starting pulse from the pulser 15 is also supplied to the frequency divider 25 via the lead 23, the transmission line 17, the decoder 27 and a lead 32 to connect the pulse generator 24 into the circuit.

The pulse generators 11 and 24 and the frequency dividers 12 and 25 each include electronic switching devices such as, for example, electron tubes or transistors. Each of these electron switching devices is operated by a biasing potential on a grid or control electrode. The pulse generators 11 and 24 in FIG. 1 and the frequency dividers 12 and 25 in FIG. 2 are normally inoperative and may be maintained in such inoperative condition by the application of a grid or control electrode potential applied to an electronic switching device thereof. The starting pulse from the pulser 15 then negates the applied potential and permits the operation of the pulse generator or frequency divider. During operation, the pulse repetition rate of the output pulses of the oscillator or pulse generator 11 and and the oscillator or pulse generator 24 builds up until at the end of the transmitted picture the pulse repetition rate is sufficiently high to reinstitute the potential applied to the grid or control electrode of the electronic switching device and thereby stops the operation of the pulse generator, as in FIG. 1, or blocks the pulse generator with respect to the circuit, as in FIG. 2.

If it is desired to provide a security aspect to the teletransmission system of the present invention this may be accomplished by encoding the starting signal or pulse produced by the pulser 15 at the transmitter station 14 by any suitable encoder and then decoding the starting signal or pulse at the receiver station 22 by any suitable decoder, before supplying said signal to the pulse generator 24 or the frequency divider 25 and before supplying said signal to the receiver 26.

The exposure and pickup process of the pickup transmitter 13 may be dispensed with by utilization of a photographic shutter on the image storing tube thereof. The shutter would provide a photographic function and the picture would be transmitted at a speed determined by the frequency range of the teletransmission system.

The teletransmission system of the present invention, by eliminating the transmission of synchronizing pulses, permits the full utilization of the line time or transmission time for the picture. That is, the full range of modulation of the transmission signals is utilized for the picture. Furthermore, due to the local synchronization of the transmitter and the receiver, there are no adverse effects of the type that occur when transmitted synchronizing signals are transmitted and are disturbed or interrupted.

In the teletransmission system of the present invention, the possible picture displacement level is very small. If the frequency of the generators 11 and 24 is assumed to be stable and to produce output pulses at a frequency having a stability of $\pm 0.5$ times $10^{-5}$, then the maximum deviation between the transmitter and the receiver is 1.0 times $10^{-5}$. If the picture has 500 lines and 500 points per line, the worst difference in synchronism would be 500 times 500 times $10^{-5}$ or 2.5 image points, and 2.5 image points difference would not be noticeable in the reproduced picture.

A highly stable crystal oscillator is especially suitable for use in the teletransmission system of the present invention. This is due to the fact that the oscillator or pulse generator is started in operation practically instantaneously by the starting pulse from the pulser 15. This eliminates the time necessary in television transmitters to adjust the synchronism and phase. The pulse generators are readily adapted to the frequency range of the available transmission channel. All that is required is the adjustment of the spacing ratio between the output pulses produced by the pulse generators.

The teletransmission system of the present invention is adaptable to connection techniques for visual retention tubes of the type utilized as the pickup transmitter 13 and the receiver 26. A number of electron beam systems may be built into the envelope of a single one of such tubes. One such electron beam system may be utilized to record the picture on a charge storing screen and another one or two of such electron beam systems may be utilized for the reproduction and termination of the picture. Under these circumstances, it is desirable to delay the start of operation of the pulse generators until a time sufficient for the warm up of the image storing tubes has elapsed.

While the invention has been described by means of a specific example and in a specific embodiment, I do not wish to be limited thereto, for obvious modifications will occur to those skilled in the art without departing from the spirit and scope of the invention.

What is claimed as new and desired to be secured by Letters Patent is:

1. A teletransmission system comprising , in combination, a transmitter station for transmitting a picture, said transmitter station including picture transmitting means, transmitter pulse generating means for generating picture line frequency synchronizing pulses connected to said picture transmitting means to control the transmission of a picture thereby, and pulsing means connected to said pulse generating means and to said picture transmitting means for providing a starting pulse to start operation of said pulse generating means and of said picture transmitting means; a receiver station for receiving a picture, said receiver station including picture receiving means, and receiver pulse generating means for generating picture line frequency synchronizing pulses substantially identical to those generated by said transmitter pulse generating means, said receiver pulse generating means being connected to said picture receiving means to control the reproduction of a picture thereby; and transmission means for transmitting a picture from the picture transmitting means of said transmitter station to the picture receiving means of said receiver station and for transmitting a start pulse from the pulsing means of said transmitter station to said receiver at said receiver station, at the time of start of transmission only for starting independent operation of said receiver pulse generating means so that said picture receiving means is controlled by said receiver pulse generating means only and without periodic transmission of synchronizing impulses from said transmission station.

2. A teletransmission system as claimed in claim 1, wherein each of said transmitter and receiver pulse generating means comprises a crystal-controlled oscillator including an electronic switching device having a control electrode having a potential normally applied thereto to maintain said oscillator normally inoperative, said starting pulse being applied to the control electrode of said electronic switching device to negate the potential applied thereto and permit operation of said oscillator.

3. A teletransmission system as claimed in claim 1, wherein each of said transmitter and receiver pulse generating means comprises a pulse generator and a frequency divider connected in the output of said pulse generator, the frequency divider of the transmitter pulse generating means being connected to said picture transmitting means and the frequency divider of the receiver pulse generating means being connected to said picture receiving means.

4. A teletransmission system as claimed in claim 3, wherein said pulsing means is connected to the pulse generator of each of said transmitter and receiver pulse generating means and the starting pulse from said pulsing means starts the operation of the pulse generator of each of said transmitter and receiver pulse generating means.

5. A teletransmission system as claimed in claim 3, wherein said pulsing means is connected to the frequency divider of each of said transmitter and receiver pulse generating means and the starting pulse from said pulsing means connects the pulse generator of each of said transmiter and receiver pulse generating means into said system, the pulse generator of each of said transmitter and receiver pulse generating means being continuously operating.

References Cited by the Examiner

UNITED STATES PATENTS 3,084,213 4/1963 Lemelson ---------------- 178

OTHER REFERENCES

Fink: "Television Engineering Handbook," McGraw-Hill, New York 1957, pp. 17–19 through 17–26.

JOHN W. CALDWELL, *Acting Primary Examiner.*

J. McHUGH, R. L. RICHARDSON, *Assistant Examiners.*